United States Patent [19]

Tsenter

[11] Patent Number: 5,900,718
[45] Date of Patent: May 4, 1999

[54] BATTERY CHARGER AND METHOD OF CHARGING BATTERIES

[75] Inventor: Boris Tsenter, Rosswell, Ga.

[73] Assignee: Total Battery Management, Augusta, Ga.

[21] Appl. No.: 08/699,130

[22] Filed: Aug. 16, 1996

[51] Int. Cl.$^6$ .............................. H02J 7/04; H01M 10/44
[52] U.S. Cl. ............................................ 320/151; 320/152
[58] Field of Search .................................. 320/150, 151, 320/152, 153, 161, 162

[56] References Cited

U.S. PATENT DOCUMENTS

| | | |
|---|---|---|
| 3,487,284 | 12/1969 | Cady . |
| 3,890,556 | 6/1975 | Melling et al. . |
| 3,911,349 | 10/1975 | Seeley et al. . |
| 3,911,350 | 10/1975 | Swope . |
| 3,953,302 | 4/1976 | Rao et al. . |
| 4,016,473 | 4/1977 | Newman . |
| 4,079,303 | 3/1978 | Cox . |
| 4,086,525 | 4/1978 | Ibsen et al. . |
| 4,139,680 | 2/1979 | Schlaikjer . |
| 4,345,008 | 8/1982 | Breault . |
| 4,385,269 | 5/1983 | Aspinwall et al. . |
| 4,388,582 | 6/1983 | Saar et al. . |
| 4,392,101 | 7/1983 | Saar et al. . |
| 4,414,291 | 11/1983 | Breault . |
| 4,554,500 | 11/1985 | Sokira . |
| 4,560,937 | 12/1985 | Finger . |
| 4,680,528 | 7/1987 | Mikami et al. . |
| 4,725,784 | 2/1988 | Peled et al. . |
| 4,746,854 | 5/1988 | Baker et al. . |
| 4,761,487 | 8/1988 | Godshall . |
| 4,806,840 | 2/1989 | Alexander et al. . |
| 5,017,856 | 5/1991 | Johnson, Jr. . |
| 5,057,762 | 10/1991 | Goedken et al. . |
| 5,119,009 | 6/1992 | McCaleb et al. . |
| 5,132,626 | 7/1992 | Limuti et al. . |
| 5,143,799 | 9/1992 | Tsenter . |
| 5,157,320 | 10/1992 | Kuriloff . |
| 5,166,596 | 11/1992 | Goedken . |
| 5,179,335 | 1/1993 | Nor . |
| 5,200,689 | 4/1993 | Interiano et al. . |
| 5,206,578 | 4/1993 | Nor . |
| 5,237,257 | 8/1993 | Johnson et al. . |

(List continued on next page.)

OTHER PUBLICATIONS

Damon W. Chu, "Tradeoffs in Implementing Intelligent Battery Management", Jul. 10, 1995, 6 pages.

David Freeman, "Freeing Portables from Battery Tyranny," Jul. 10, 1995, 6 pages.

*Primary Examiner*—Peter S. Wong
*Assistant Examiner*—K. Shin
*Attorney, Agent, or Firm*—Reed Smith Shaw & McClay

[57] ABSTRACT

A battery charger and method of charging a rechargeable battery which comprises charging the battery with an initial charging current and measuring and comparing the charging temperature to an initial temperature to identify a temperature factor which either identifies a need to lower the current or terminate the charging current. The temperature factor may be a temperature gradient $\Delta T$. The open circuit voltage may be monitored from the beginning or may begin when $\Delta T$ is identified. $V_{OCV}$ is plotted with respect to time t elapsed to identify a point or points on the $V_{OCV}(t)$ curve, such as an inflection point in the $dV_{OCV}/dt$ data or a transition point in the $d^2V_{OCV}/dt^2$ which indicate the onset of overcharge. If the open circuit voltage $V_{OCV}$ of the battery is sampled from the beginning of charging the second order differential information should be ignored until a predetermined temperature gradient is realized. If a point indicating onset of overcharge is not recognized then charging is continued and the steps above are repeated until a point or points indicating onset of overcharge are identified. As a safeguard against overcharge, the inflection point on $dV_{OCV}/dt$ curve is utilized to indicate onset of overcharge even if the inflection point on the $d^2V_{OCV}/dt^2$ curve is not identified and the negative slope—$dV_{OCV}/dt$ is utilized to indicate onset of overcharge if the inflection point on the $dV_{OCV}/dt$ data is not identified.

45 Claims, 6 Drawing Sheets

U.S. PATENT DOCUMENTS

| | | | |
|---|---|---|---|
| 5,278,000 | 1/1994 | Huang et al. . | |
| 5,290,640 | 3/1994 | Icenter et al. . | |
| 5,291,117 | 3/1994 | Rydbom . | |
| 5,296,997 | 3/1994 | Betton et al. . | |
| 5,304,915 | 4/1994 | Sanpei et al. . | |
| 5,304,917 | 4/1994 | Somerville . | |
| 5,307,000 | 4/1994 | Podrazhansky et al. . | |
| 5,321,347 | 6/1994 | Chien . | |
| 5,329,219 | 7/1994 | Garrett . | |
| 5,330,861 | 7/1994 | Fetcenko et al. . | |
| 5,331,268 | 7/1994 | Patino et al. . | |
| 5,343,380 | 8/1994 | Champlin . | |
| 5,349,281 | 9/1994 | Bugaj . | |
| 5,350,995 | 9/1994 | Iketani . | |
| 5,350,996 | 9/1994 | Tauchi . | |
| 5,352,967 | 10/1994 | Nutz et al. . | |
| 5,365,160 | 11/1994 | Leppo et al. . | |
| 5,369,364 | 11/1994 | Renirie et al. . | |
| 5,376,873 | 12/1994 | Toya . | |
| 5,391,193 | 2/1995 | Thompson . | |
| 5,396,163 | 3/1995 | Nor et al. . | |
| 5,408,170 | 4/1995 | Umetsua et al. . | |
| 5,411,537 | 5/1995 | Munshi et al. . | |
| 5,412,306 | 5/1995 | Meadows et al. . | |
| 5,418,084 | 5/1995 | Georgopoulos . | |
| 5,422,559 | 6/1995 | Hall et al. . | |
| 5,432,029 | 7/1995 | Mitate et al. . | |
| 5,432,426 | 7/1995 | Yoshida . | |
| 5,432,429 | 7/1995 | Armstrong et al. . | |
| 5,440,221 | 8/1995 | Landau et al. . | |
| 5,442,274 | 8/1995 | Tamai . | |
| 5,444,353 | 8/1995 | Shinohara . | |
| 5,449,996 | 9/1995 | Matsumoto et al. . | |
| 5,449,997 | 9/1995 | Gilmore et al. . | |
| 5,460,899 | 10/1995 | Charkey . | |
| 5,467,005 | 11/1995 | Matsumoto et al. . | |
| 5,477,125 | 12/1995 | Ettel et al. | 320/161 |
| 5,483,165 | 1/1996 | Cameron et al. . | |
| 5,489,836 | 2/1996 | Yuen . | |
| 5,498,492 | 3/1996 | Hara et al. . | |
| 5,500,583 | 3/1996 | Buckley et al. . | |
| 5,541,492 | 7/1996 | Fernandez et al. | 320/151 |
| 5,541,496 | 7/1996 | Simmonds | 320/151 |
| 5,550,453 | 8/1996 | Bohne et al. | 320/152 |
| 5,563,496 | 10/1996 | McClure | 320/151 |
| 5,583,871 | 12/1996 | Simmonds et al. | 320/151 |
| 5,592,069 | 1/1997 | Dias et al. | 320/152 |
| 5,627,451 | 5/1997 | Takeda | 320/151 |
| 5,629,604 | 5/1997 | Sengupta et al. | 320/152 |
| 5,633,574 | 5/1997 | Sage | 320/152 |
| 5,635,820 | 6/1997 | Park | 320/152 |
| 5,642,032 | 6/1997 | Kokuga | 320/152 |
| 5,666,039 | 9/1997 | Odaohara et al. | 320/152 |
| 5,686,815 | 11/1997 | Reipur et al. | 320/151 |
| 5,701,068 | 12/1997 | Baer et al. | 320/152 |
| 5,703,465 | 12/1997 | Kinoshita et al. | 320/151 |
| 5,705,915 | 1/1998 | Douglas et al. | 320/152 |
| 5,710,501 | 1/1998 | Van Phuoc et al. | 320/152 |
| 5,729,116 | 3/1998 | Tsenter | 320/151 |

BATTERY CHARGER AND METHOD OF CHARGING BATTERIES

BACKGROUND OF THE INVENTION

1. Field of the Invention

The invention relates generally to a battery charger and a method of charging a rechargeable battery, specifically alkaline secondary battery, Ni—Cd (Nickel-Cadmium), Ni—H (Nickel-Hydrogen) and Ni—MeH (Nickel Metal-Hydride) batteries.

2. Description of Related Art

In recent years, a large number of portable electronic devices, i.e. cellular phones, two-way radios, laptop computers and camcorders have become available. Accordingly, it has become necessary to provide a battery that is in a continuous state of operational readiness. In this regard, it is preferable to utilize a rechargeable battery and a method of recharging the battery which avoids both under and overcharging.

The charging of batteries involves forcing electrical current through the battery, usually under some control of the current (e.g. constant current) and often with some voltage control as well (e.g. maximum voltage). While there is some need for controlling the rate of the charging process itself, the most important need for control is when the battery becomes fully charged. After this point, continued charging of the battery leads to undesirable and wasteful overcharge reactions. Overcharge reactions in vented cells result in electrolysis and loss of water that has to be replaced, while in sealed cells it creates pressure and heat since the recombination reactions of gases produced during overcharge are exothermic.

Ideally, the overcharge reactions that require higher voltage can be prevented simply by limiting the charging voltage to a certain value. This simple approach is, unfortunately, only partially successful with certain cell types, e.g. lead acid cells, vented NiCd cells, and sealed lithium ion cells.

Sealed cells capable of recombining the overcharge reaction products are able to tolerate overcharge at low rates because the pressures of by-product gases are low and the heat generation is slow enough for the heat to be easily dissipated and lost. As long as no electrolyte constituent is being lost, it is not critical to terminate charging. However, continuous overcharge even at a low rate reduces the cycle life of the cells.

Rapid charging, i.e. charging in less than one hour, presents much more of a challenge with both vented and sealed cells. The first problem results from the limited rate of charge distribution or equilibration within the electrode plates. Also, at higher charge rates, the overcharge reactions begin to appear at a lower fraction of full charge. When overcharge reactions appear, the current efficiency of the charge reactions decline and most of the columbic energy is wasted on the overcharge reactions. To complete the charging process under these conditions overcharge reactions are tolerated for a sufficiently long time. This process causes damage to the battery. The rapid heating of a battery during high rate overcharge cannot be avoided and may cause safe pressure to be exceeded, as well as cell venting.

U.S. Pat. No. 5,352,967 details some of the known methods of charging storage batteries. The methods disclosed therein focus on various techniques of determining proper charged termination and include: constant current mode; delta temperature/delta time mode (dT/dt); negative delta voltage charge mode ($-\Delta V$); positive delta voltage or delta voltage/delta time mode (dV/dt); pulse charge mode; and reflex mode. In the constant current charge mode, the battery is continuously overcharged with a low current. Although the expenditure for a constant current source is relatively low, the long charging time causes damage to the cell. In the constant charge mode, it is customary to restrict the charging time. Therefore, as soon as a predefined time has elapsed, the charging operation is terminated. Accordingly, since the constant current charge mode does not take into account the charge condition or chemical makeup of the cell under or overcharging of the cell can result.

In delta temperature/delta time charging (dT/dt), the charging current is switched off once a predetermined slope in the temperature versus time curve has been reached. This method can generate false termination signals. The charging process may be terminated prior to the battery being fully charged if preset value of dT/dt is too low, or conversely, if dT/dt is too large, the charging process may be terminated too late.

In the negative delta voltage charge mode, a negative slope in the charge curve (dV/dt<0) which appears after complete charging of the battery is used to terminate charging. The batteries are charged from a constant current source, and the charging voltage rises steadily for as long as the cell is capable of converting the supplied energy into chemical energy. When the batteries are no longer capable of storing the supplied energy, the supplied energy is converted into heat, and the cell voltage drops. The drop in the cell voltage is used as an indicator to terminate charge. However, this method can only be used for those type of batteries permitting high-current charging. The charging method itself suffers from the fact that during the charge operation, surface effects may result in fluctuations in the battery voltage. These fluctuations may be erroneously interpreted as a signal to terminate charge. Therefore, premature break off of the charging operation is often seen when utilizing the negative delta voltage charge mode. Additionally, nickel-metal hydride batteries do not have the pronounced charging voltage curves seen in nicad batteries, and as a result, are often overcharged using the negative delta voltage charge mode.

In the positive delta voltage or delta voltage/delta time mode (dV/dt), the slope of the voltage charging curve is evaluated to determine when to terminate charging of the battery. Theoretically, the rise in the charging voltage decreases when the battery is near full charge. Utilizing the mathematical differential of the charge curve, the reduction in this rise in the charging voltage can be evaluated as the criteria for terminating charging. This method suffers from the fact that the difference in the rise may not be dramatic enough to cause termination of the charging at a proper time with ensuing overcharge of the battery. Additionally, due to fluctuation in the charging curve, this first order derivative charging method may terminate charging prematurely.

Pulse charging utilizes a high current charge followed by an interruption period. The interruption period allows the voltage of the battery to be determined during a currentless phase or under open circuit voltage conditions (OCV) in order to determine the open circuit voltage of the battery ($V_{OCV}$). Charging is terminated when $V_{OCV}$ has reached a preset reference voltage ($V_{REF}$). However, as discussed herein, the reference voltage has a degree of uncertainty, and the value often depends on the rate of charge and the battery's design criteria. This method does not take these factors in to consideration when determining termination of charging.

Reflex mode charging also monitors the $V_{OCV}$, but follows the charging mode with a discharge period and determines and stores $V_{MAX}$. This $V_{MAX}$ is used as a reference wherein charging is terminated when $V_{OCV}$ is equal to or greater than $V_{MAX}$. Reflex mode charging necessitates discharge of the battery.

Each of the methods discussed above suffer from potential under or overuse charge of the battery or cell. As discussed herein, overcharging a battery is very dangerous. A more accurate determination of charge termination which has been described in the related art in a limited manner is the use of a second order derivative of the charge versus time curve ($d^2V/dt^2$) to signal charge termination.

U.S. Pat. No. 5,477,125 proposes a method of recharging a battery which comprises the steps of periodically interrupting the charge current, sampling the resistance free voltage ($V_O$) after a delay period, and determining point or points on the $V_O(t)$, $dV_O/dt$ and $d^2V_O/dt^2$ curve which indicate onset of overcharge to signal charge termination. The current measuring periods are repeated every 10 seconds, and a delay period after current interruption is used to allow the battery to reach an equilibrium.

According to U.S. Pat. No. 5,477,125, after identifying the onset of overcharge, a suitable $V_{REF}$ is chosen as a function of either one or a weighted average of two or more characteristic points of overcharge. $V_{REF}$ is chosen for example by increasing $V_O$ by a certain percentage point (minimum on $dV_O/dt$ curve) or by decreasing $V_O$ by a certain percentage ($V_O$ corresponding to either the maximum on $d^2V_O/dt^2$ curve). An educated guess as to the percentage of $V_{REF}$ (i.e. 98% of $V_O$ corresponding to maximum on $d^2V_O/dt$ curve or 95% of $V_O$ corresponding to maximum on $dV_O/dt$ curve) is used as the termination point. This guesswork can result in accidental overcharging or under charging of the battery and ultimately leads to poorer performance and cell cycle life of the battery. U.S. Pat. No. 5,477,125 states that the $V_{REF}$ is independent of rate of charge. However, the present disclosure indicates that this appears to be an overbroad or erroneous statement. Establishing $V_{REF}$ independent of the rate of charge will cause $V_{REF}$ to have a large degree of error. The type of crystal that forms on the nickel oxide electrode is sensitive to the rate of charge being applied to the battery. A high rate of charge results in γ-NiOOH while a low rate of charge results in β-NiOOH crystal formation. The difference between these two is 30–40 mv under open circuit voltage conditions. Additionally, the interval after charge interruption at which the voltage of the battery is measured is important due to the fact that the open circuit voltage is unsteady for some time after charge interruption. The fluctuation at different time intervals depends on the rate of charge, the battery design and charging temperature. The rate of charge, for example, may increase the potential of the nickel-oxide electrode by 60–80 mv due to the appearance of high valence $NiO_2$ at the end of charge. Considering only those factors enumerated above, an error in determining $V_{REF}$ on the order of at least 90–120 mV can be made if $V_{REF}$ is determined independent of the rate of charge.

SUMMARY OF THE INVENTION

This invention relates to an improved charging device for rechargeable batteries and cells. More particularly this invention relates to an improved battery charger capable of very rapid and "gentle" charging.

The present invention generally relates to a method of charging a rechargeable battery by which charge termination is signalled by combining temperature gradient or change in temperature information with voltage values sampled under open circuit voltage condition. Depending on the type of rechargeable battery being charged, and the initial temperature of the battery, a predetermined temperature factor may be utilized to indicate the onset of oxygen production, oxygen production being adverse to the cell life of the battery. Accordingly, this temperature factor may be recognized as a signal to adjust the charging current or a signal to monitor the open circuit voltage of the battery. The charging current may be lowered, switched to trickle, or terminated when a predetermined temperature factor is identified. The $V_{OCV}$ is sampled, compiled, and analyzed periodically. Correlating the first and second order differentials, as well as the negative slope, of the $V_{OCV}$ versus time data with a temperature information allows the battery to be charged without switching off or terminating too early or too late due to false readings. This enables the battery to be more fully charged quickly and safely.

Another aspect of the present invention is sampling the voltage within the first 1–5 ms after charge interruption. This ohm-free voltage $V_\Omega$ measurement provides an indication of the proper trickle charge to be applied to the battery after the battery has reached full charge. Utilizing $V_\Omega$ to control trickle charge substantially avoids hydrogen production during the trickle charge process. This is advantageous because hydrogen production can also be adverse to the useful life of the battery.

Another aspect of the present invention is a method which considers the chemical effect of the rate of charge on the electrochemistry of the cell (i.e. the production of β-NiOOH using low charging current as opposed to the production of γ-NiOOH using high charging current).

Specifically, the present invention provides a method of charging a rechargeable battery which includes the steps of: measuring an initial temperature $T_i$ of the battery; charging the battery with a charging current; sensing a charging temperature T of the battery; comparing the charging temperature T of the battery to the initial temperature $T_i$ of the battery to derive a temperature factor which indicates a need to adjust the charging current; sampling an open circuit voltage $V_{OCV}$ of the battery; compiling values for the open circuit voltage $V_{OCV}$ with respect to charging time t elapsed; analyzing the compiled values for $V_{OCV}$ and t to identify one or more $V_{OCV}$ points which indicate a need to adjust the charging current; continuing charging if the temperature factor or $V_{OCV}$ points are not identified; and adjusting the charging current if the temperature factor or $V_{OCV}$ points are identified. Values for $V_{OCV}$ may be analyzed with respect to time t elapsed since either $\Delta T$ was first identified or charging begins. The points indicating a need to adjust the charging current can be: a temperature factor (i.e. a temperature gradient $\Delta T$ (T−$T_i$) or slope (dT/dt; the information provided by the $V_{OCV}$ as a function of time data ($V_{OCV}(t)$), such as an inflection point in the first order differential data ($dV_{OCV}/dt=0$), a transition point in the second order differential data ($d^2V_{OCV}/dt^2=0$), a negative slope in the $V_{OCV}(t)$ data; or a function of any two or all three of the above points.

If a point indicating a need to adjust the current or the onset of overcharge is not recognized then charging is continued and the steps above are repeated until a point or points indicating a need to adjust the current is identified. As a safeguard against overcharge, the inflection point on $dV_{OCV}/dt$ curve is utilized to indicate onset of overcharge. If either the inflection point in $dV_{OCV}/dt$ data or the negative slope in the $V_{OCV}(t)$ data ($-dV_{OCV}/dt$) is recognized prior to the transition area or point in the $d^2V_{OCV}/dt^2$ data, then charge is terminated or switched to trickle charge.

When charging has been terminated a trickle charge is supplied to the battery to maintain the battery in a fully charged condition. The trickle charge can be a continuous constant-current charge at a low (about C/20) rate, or alternatively as in the preferred embodiment of the present invention, a much larger trickle rate in pulsed durations is utilized to prevent larger size crystal formation on the electrodes. Although the pulsed rate is at a much higher rate, when the duration of the high current rate is factored in, the average current charge is maintained within the normally acceptable limits.

Another aspect to the present invention is the determination of the proper trickle charge through measuring the ohm-free voltage $V_\Omega$, which is the voltage measured from about one millisecond to about 5 milliseconds after interrupting the trickle charge, and the trickle open circuit voltage $V_{OCV}$ (trickle) between about 5 and 100 milliseconds after interrupting the trickle charge. If the open circuit ohm-free voltage $V_\Omega$ is greater than or exceeds a predetermined threshold trickle charge the rate of trickle charge is reduced. Additionally, the threshold trickle charge is the sum of an overvoltage value for a hydrogen producing electrode and the open circuit voltage $V_{OCV}$ (trickle) of the battery. It is also contemplated herein to alternate charging to a first battery and trickle charging to a second battery. The respective periods of charging or trickle charging occurring during the rest or interrupt time period in one or the other battery.

Another aspect of the present invention utilizes a preferred method of establishing a rate of charge. The method comprises charging the battery with a charging current at an initial rate which is near the rated capacity in ampere-hours of the battery (1 C), sampling the open circuit voltage $V_{OCV}$ of the battery when the estimated percentage of full charge to the battery is 1.5–4% the rated capacity of the battery, utilizing this $V_{OCV}$ to determine an amount of heat being produced by the battery, and adjusting the rate of charge so that heat consumed by the battery is near or equal to the heat produced by the battery. During charging the rate of charge results in a charging voltage being applied to the battery. This along with the thermonuetral potential $E^T$, stable open circuit voltage $E^O$ of the battery, and the overvoltage per cell, allows the rate of charge to be adjusted so that the overvoltage per cell is near the difference between the thermonuetral potential $E^T$ and the stable open circuit voltage $E^O$ of the battery. The overvoltage is the difference between the charging voltage and the open circuit voltage, thus being a function of the ohmic resistance and chemical resistance.

Finally, a battery charger which accomplishes the methodology discussed herein is provided. It includes a power supply to provide charging current, a thermistor or temperature sensor for measuring the temperature of the battery, a temperature comparator such as a microprocessor to compare and calculate temperature factors, and a charge interrupter for periodically interrupting the charging current in order to sample the open circuit voltage. Also included in the battery charger is a power manager to adjust the charging current when a point or points indicating the need to adjust the current are identified. Additionally, there is provided a voltage detector or microcontroller for sampling, compiling and analyzing $V_{OCV}$ with respect to time t elapsed to identify a point indicating either a need to adjust the current, the onset of oxygen production, or the onset of overcharge. The power manager may also be used to supplying a trickle charge to the battery upon terminating the charging current. The microprocessor can also be use to switch the charging current to a second battery when charging to a first battery has been interrupted or terminated. The microprocessor may be utilized to combine, compile, analyze and determine the preferred rate of charge for the battery. Temperature, current and voltage sensors provide communication and data between the battery and microcontroller.

Accordingly, it is an object of the present invention to combine temperature gradient information with $V_{OCV}(t)$, $dV_{OCV}/dt$ and $d^2V_{OCV}/dt^2$ to provide a method to quickly charge a battery and determine an accurate point of charge termination.

It is a further object of the present invention to provide a charge method which accounts for "noise" that occurs during charging.

It is a further object of the present invention to provide a charge method which ignores false indicators of charge termination.

It is a further object of the present invention to take into consideration the ohmic component and chemical component of $V_{OCV}$ when sampling, compiling and analyzing $V_{OCV}$ versus time.

It is a further objection of the present invention to prevent undesirable crystal formation on the respective electrodes during charging and trickle charging.

Yet another object of the present invention is to reduce the amount of microprocessor time dedicated to monitoring and analyzing the voltage factors of the cell.

Yet another object of the present invention is to provide a preferred methodology for providing and adjusting the rate of trickle charge.

Yet another object of the present invention is to provide a methodology for formulating a preferred rate of charge to extend the life cycle of a rechargeable battery.

BRIEF DESCRIPTION OF THE DRAWINGS

These and further objects of the present invention will be apparent with reference to the following description and drawings, wherein.

DETAILED DESCRIPTION OF THE PREFERRED EMBODIMENT

Figure 1:
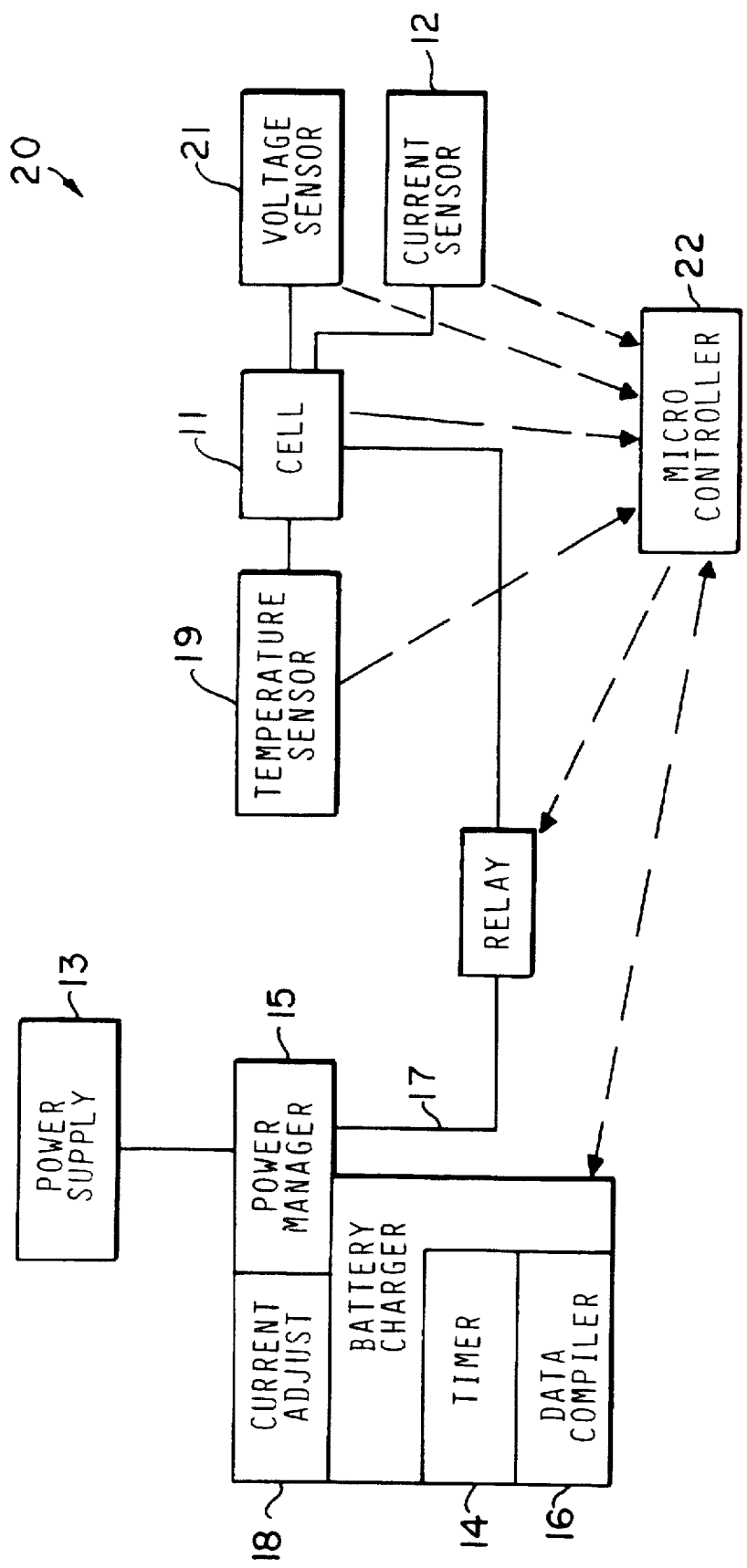
FIG. 1 is a schematic circuit diagram for one embodiment of the invention.

FIG. 1 best illustrates a general schematic view of the present invention. A rechargeable battery 11 is charged utilizing indicators of overcharge, oxygen production, or a need to adjust the current, which allows the battery 11 to substantially avoid overcharge while achieving full charge, thereby increasing cell-cycle life and the usefulness of the battery 11. Although the terms battery and cell are used interchangeably herein, a battery consists of one or more cells connected in series, or parallel, or both depending on the desired output voltage and capacity of the battery. The cell is the basic electrochemical unit and consists of the anode, cathode, and electrolyte. When a full state of charge is discussed herein, it is to be understood that the battery or cell 11 being charged has reached nearly 100% of the capacity of stored energy, measured in ampere-hours. The rechargeable battery 11 can be any secondary battery or rechargeable battery and preferably is a nickel cadmium battery or nickel metal hydride battery.

Figure 2A:
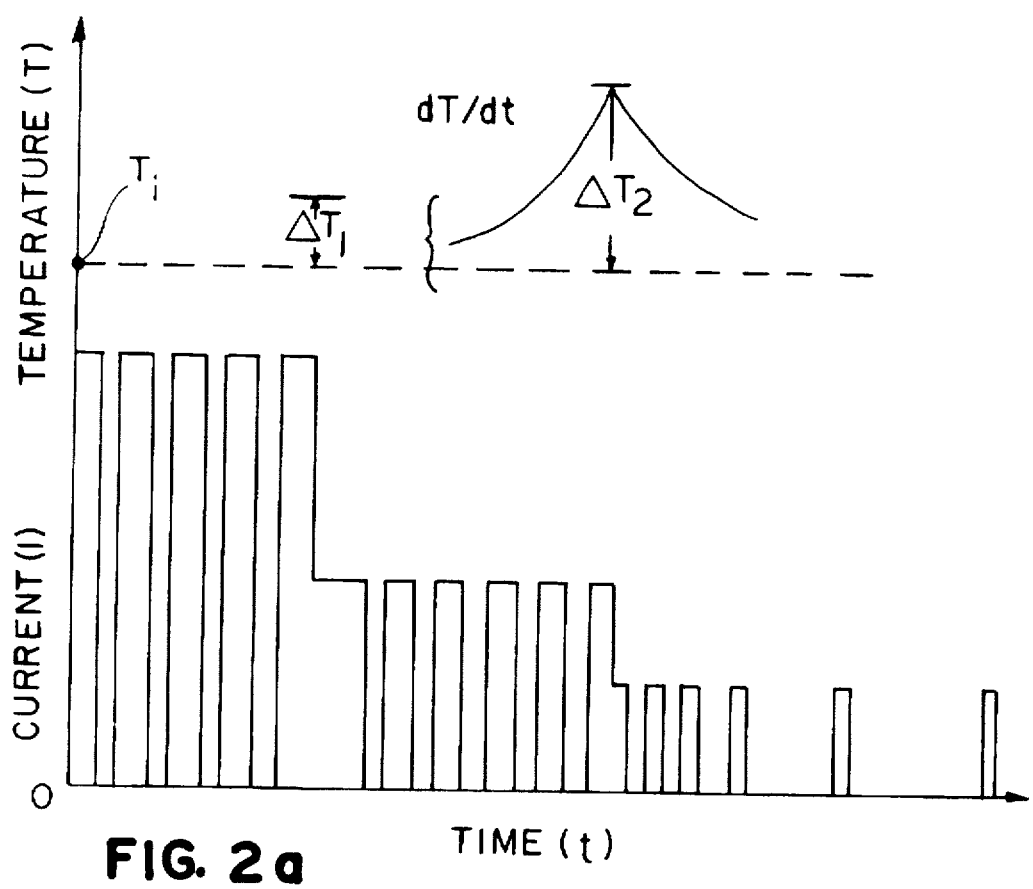
FIG. 2a is a charging curve illustrating the overall charging logic of the present invention.
Figure 2B:
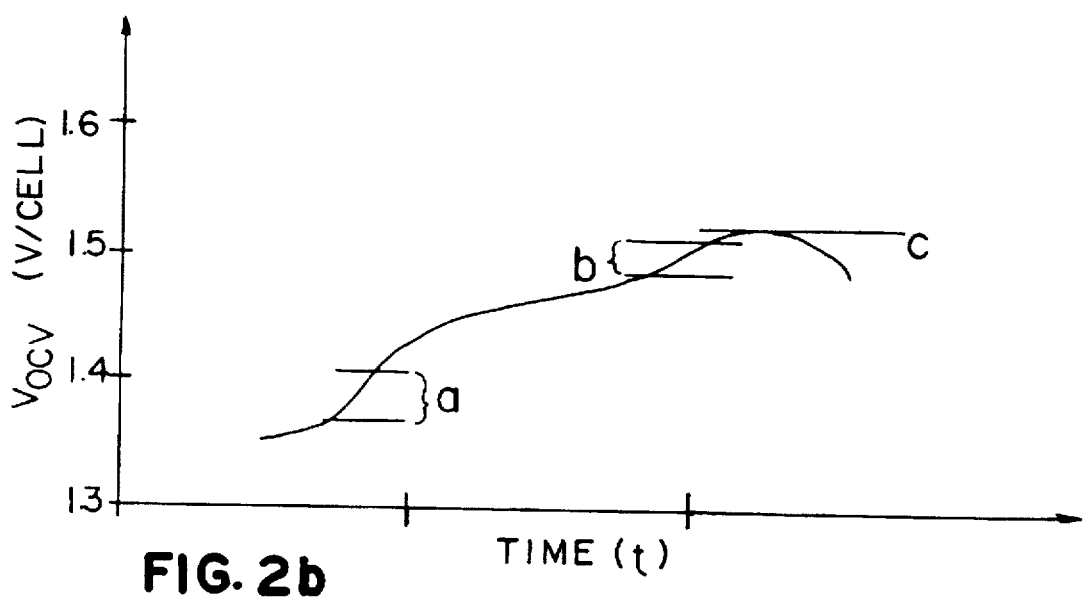
FIG. 2b is a graph of $V_{OCV}$ versus time for a battery charged according to the present invention.

Referring to FIGS. 2a and 2b, the preferred method of charging the rechargeable battery 11 is illustrated. An initial temperature $T_i$ of the battery 11 is measured. The initial temperature $T_i$ may be measured or detected prior to charging or soon thereafter. After measuring initial temperature $T_i$, the battery is charged with an initial charge current which is near the capacity in ampere-hours of the battery 11 (near 1 C). A 1 C charge theoretically provides a full charge in one hour. The temperature of the battery is monitored, during the charging process in order to recognize a temperature factor which indicates a need to adjust the charging current of the battery. Sampling the charging temperature T at a point in time and comparing this to the initial temperature $T_i$, a temperature gradient $\Delta T_1$ can be calculated. As seen in FIG. 2a, $\Delta T_1$ can be used as an indicator to lower the charging current of the battery 11. After lowering the charging current and allowing predetermined time to elapse so that the battery 11 can equilibrate, the charging current is interrupted so that an open circuit voltage $V_{OCV}$ of the battery 11 can be sampled. The open circuit voltage $V_{OCV}$ is compiled with respect to time t elapsed. The time t elapsed may either be calculated from the time charging began or from the time $\Delta T_1$ was identified. The $V_{OCV}$ -vs- t data which can take the physical form of a curve (FIG. 2b) is analyzed to identify one or pore points indicative of either a need to lower the charging current or a need to switch to trickle or terminate due to the onset of overcharge. If a point indicating onset of overcharge is identified, the charging current is terminated or lowered. However, if the point indicating onset of overcharge is not identified, charging is continued. As seen in FIG. 2a, charging is usually continued at a lower rate. It should be noted, however, that charging may be continued at the same or greater rate depending on the status of the battery 11. The steps above are repeated until the compiled and analyzed values of $V_{OCV}$ and t indicate the need to adjust or terminate the charging current. From the $V_{OCV}$ -vs- t data, information can be obtained regarding the first order differential, $dV_{OCV}/dt$, and the second order differential $d^2V_{OCV}/dt^2$. As described herein, the need to adjust the charging current is indicated by a predetermined temperature factor (i.e. a temperature gradient or slope on the temperature -vs- time curve), an inflection point or points in the first order derivative data $dV_{OCV}/dt$, a transition area or point in the second order derivative data $d^2V_{OCV}/dt^2$, a negative slope on the $V_{OCV}(t)$ curve and finally a function of any two or all of these points. Transition area or transition point as used herein is meant to define an area on the $V_{OCV}$ -vs- t curve or where $d^2V_{OCV}/dt^2$ is equal to zero. This is any point for whatever duration of time on a $d^2V_{OCV}/dt^2$ curve wherein the points comprising the curve change signs. In FIG. 2b the transition area on the $V_{OCV}$ -vs- t curve is indicated by region a, and region b. Point or points c in FIG. 2b is the inflection point in the $dV_{OCV}/dt$ data ($V_{OCV}$max or $dV_{OCV}/dt$ equal to zero).

Figure 3:
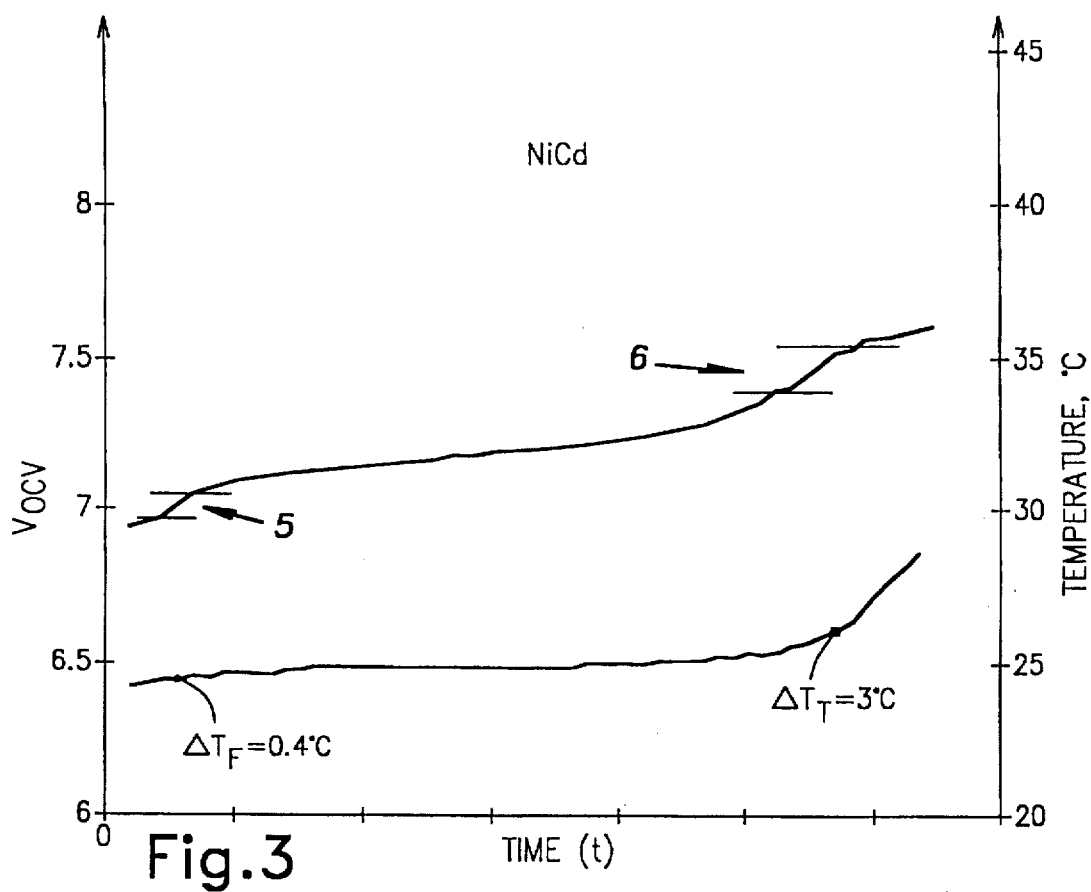
FIG. 3 is a graph of open circuit voltage $V_{OCV}$ of a Ni—MeH battery versus charging time t with a corresponding curve of temperature of the battery versus time charging.

FIG. 3 illustrates the correlation of the second order differential $d^2V_{OCV}/dt^2$ with the temperature versus time curve of a battery 11 which avoids false termination signals. A thermoresistor or temperature sensor 19 (see FIG. 1) is used to measure the respective temperature gradients. The battery 11 monitored to derive FIG. 3 was a five cell NiCd battery, with a battery voltage of 6 volts and a rated capacity of 0.6 Ah. The first transition area 5 identified on the second order differential curve of FIG. 3 is a false temperature gradient $\Delta T_F$ because it is only 0.4° C. and is not sufficient to confirm charge interruption or lowering of the charge current. When a second temperature gradient $\Delta T_T$ true temperature gradient, and a corresponding equal to or greater than 3° C. is identified transition point 7 is recognized, the charging current is lowered to a second charging rate and is continued for a period ranging from about 1 minute to about 6 minutes in which time the battery 11 is allowed to equilibrate (See FIG. 2a) before the open circuit voltage $V_{OCV}$ is sampled. $\Delta T_T$ of FIGS. 3 and 4 correspond to $\Delta T_1$ of FIG. 2a and $\Delta T_T$ is not shown in FIG. 2a because this false indicator of charge adjustment is ignored. In order for a transition point on the $V_{OCV}$ -vs- t curve to be considered a true signal to either adjust the charging rate or terminate charging, it must be correlated to a predetermined true temperature gradient $\Delta T_T$. For NiCd batteries $\Delta T_T$, $\Delta T_1$ and $\Delta T_2$ should be in the range of 2–8° C., preferably 2–6° C., more preferably 2–4° C. and even more preferably 2–3° C.

Figure 4:
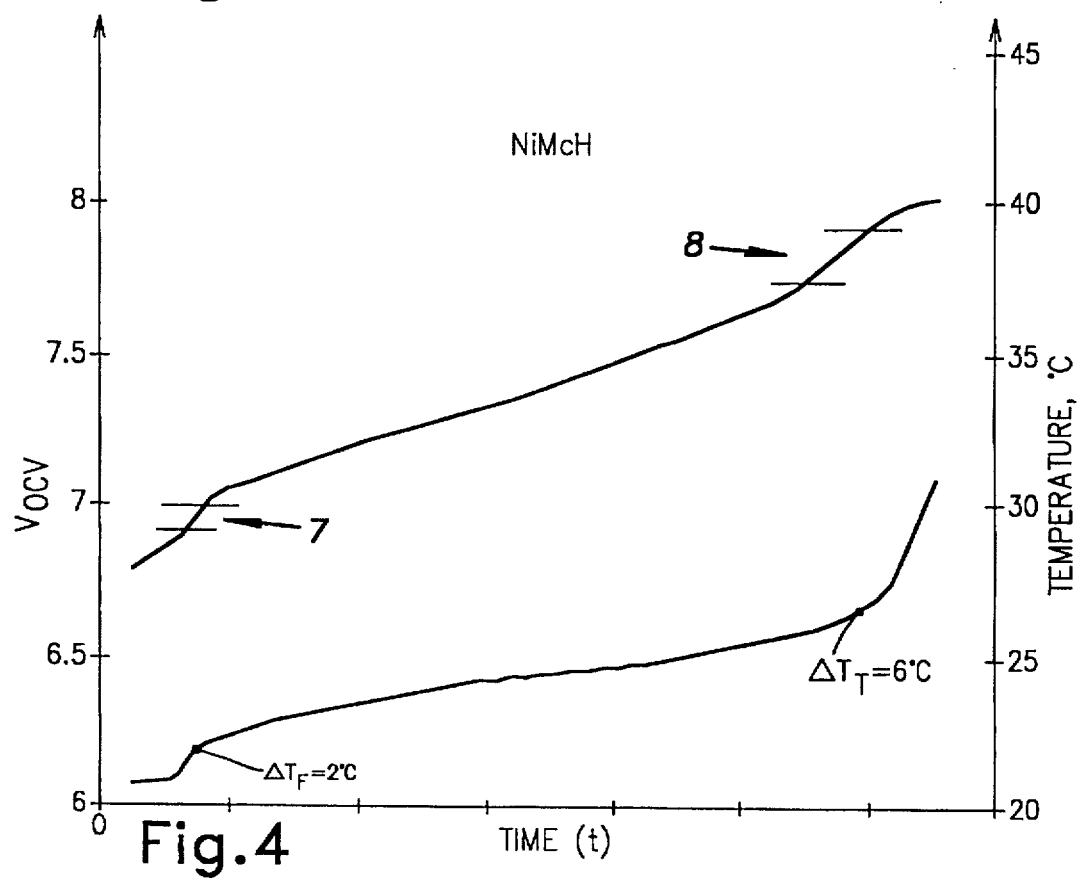
FIG. 4 is a graph of open circuit voltage $V_{OCV}$ of a Ni—Cd battery versus time charging t with a corresponding curve of temperature of the battery versus time charging.

FIG. 4 illustrates the avoidance of false signals for a Ni—MeH battery. The Ni—MeH battery of this example was 6 cell battery with a voltage of 7.2 V and a rated capacity of 0.6 Ah. The initial temperature of the nickel metal hydride battery was near room temperature (approximately 21° C.). The transition area 7, corresponding to the second order differential $d^2V_{OCV}/dt^2$ being equal to or near zero in the first five minutes of charging could be viewed as an indicator of the onset of overcharge. However, since the temperature gradient $\Delta T_F$ of the temperature -vs- time curve is only equal to about 2° C., this transition point is ignored and charging at the initial rate is continued until a second temperature gradient $\Delta T_T$ of 6° is recognized. When this second temperature gradient $\Delta T_T$ is identified, the charging current is lowered to a lower charging rate and continued for a period of 3–5 minutes to allow the battery to equilibrate. After this initial equilibration period, the open circuit voltage $V_{OCV}$ of the battery is sampled, compiled and analyzed. As seen in FIG. 4, the second transition point or area 8 corresponding to the second order differential curve $d^2V_{OCV}/dt^2$, being equal to zero when correlated with the temperature gradient $\Delta T_T$ equal to 6° C. is a signal to lower or terminate charging. The $d^2V_{OCV}/dt^2$ transition point coincides before the temperature gradient $\Delta T_T$, but charging is not terminated until the predetermined temperature is reached. Accordingly, the predetermined temperature $\Delta T_T$ gradient can be adjusted, i.e. to 5° C., so that the transition point $d^2V_{OCV}/dt^2$ can be earlier identified. However, even when transition point 8 is not identified, the inflection point corresponding to $dV_{OCV}/dt=0$ can be used as an indicator of the onset of overcharge.

Nickel-metal hydride batteries generate much more heat in comparison to nickel-cadmium batteries during charging. Therefore, it is sometimes difficult to recognize the proper predetermined temperature gradient before the onset of oxygen production. Since the temperature gradient is much more pronounced in nickel-metal hydride batteries the recognition of a predetermined temperature gradient works well in signalling charge termination.

The following examples provide a concise summary of the type of logic that may be used in accordance with the present invention.

In one example of the present logic, pulse charging (FIG. 2a) is commenced at a rate of 1 C. The initial temperature $T_i$ is sensed at the very beginning of charging, and when a charging temperature T is detected which results in a temperature gradient $\Delta T$ ($T-T_i$) exceeding a predetermined temperature gradient $\Delta T°$, open circuit voltage measurements begin. $V_{OCV}(t)$ data is compiled and analyzed to identify: (1) a transition area corresponding to $d^2V_{OCV}/dt^2 \leq 0$; (2) an inflection point corresponding to $dV_{OCV}/dt=0$; (3) a negative slope corresponding to $dV_{OCV}/dt<0$. If none of these points are recognized either the rate of temperature increase dT/dt being greater than a predetermined temperature gradient, $dT/dt > dT°/dt$ (i.e. $dT/dt > 0.5°$ C./min) or an extreme temperature gradient ($\Delta T_2$) are used as emergency signals to terminate charging and switch to trickle charging. This approach does not monitor any open circuit until predetermined temperature gradient ($\Delta T_1$) has been recognized. In this example it may also be possible to charge at with constant initial charging current instead of pulsed charging since there is no need to interrupt the charging to sample the open circuit voltage. Accordingly microprocessor time is not utilized in this time period to analyze or compile open circuit voltage information.

Figure 8A:
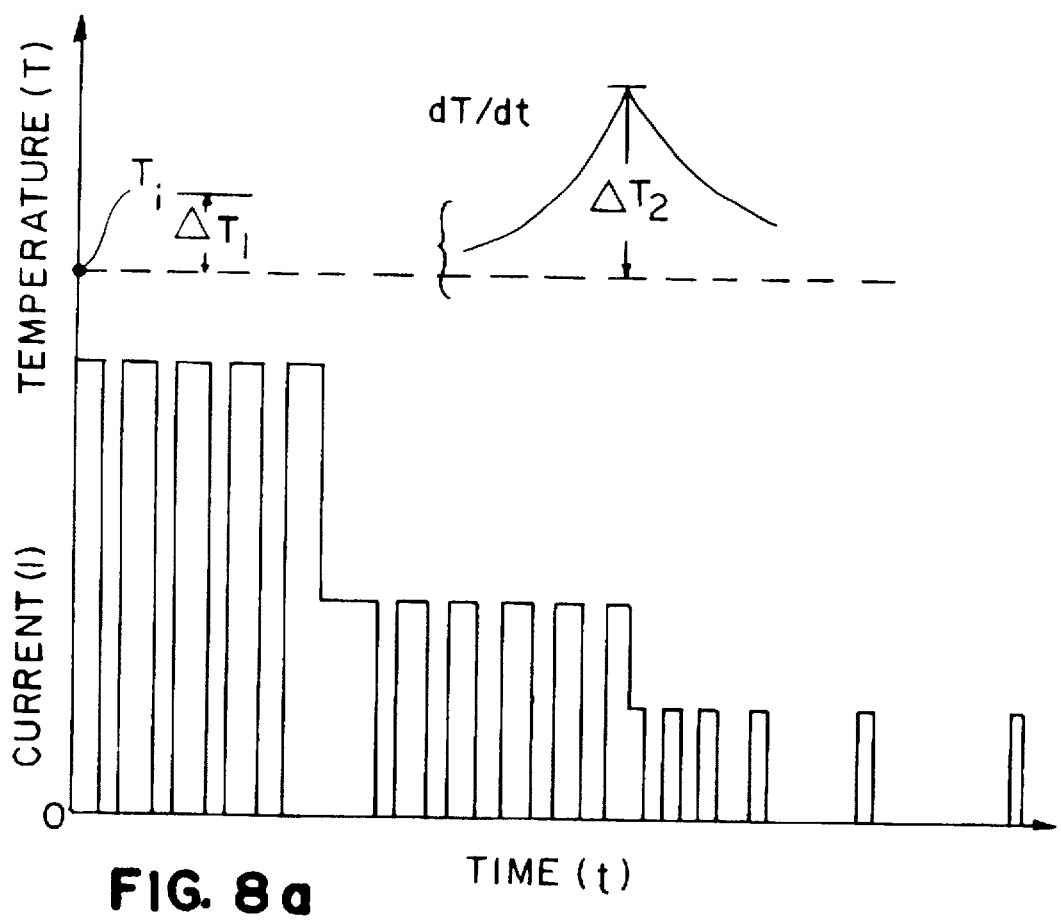
FIG. 8a is a charging curve illustrating the overall charging logic of an alternative approach to the present invention.
Figure 8B:
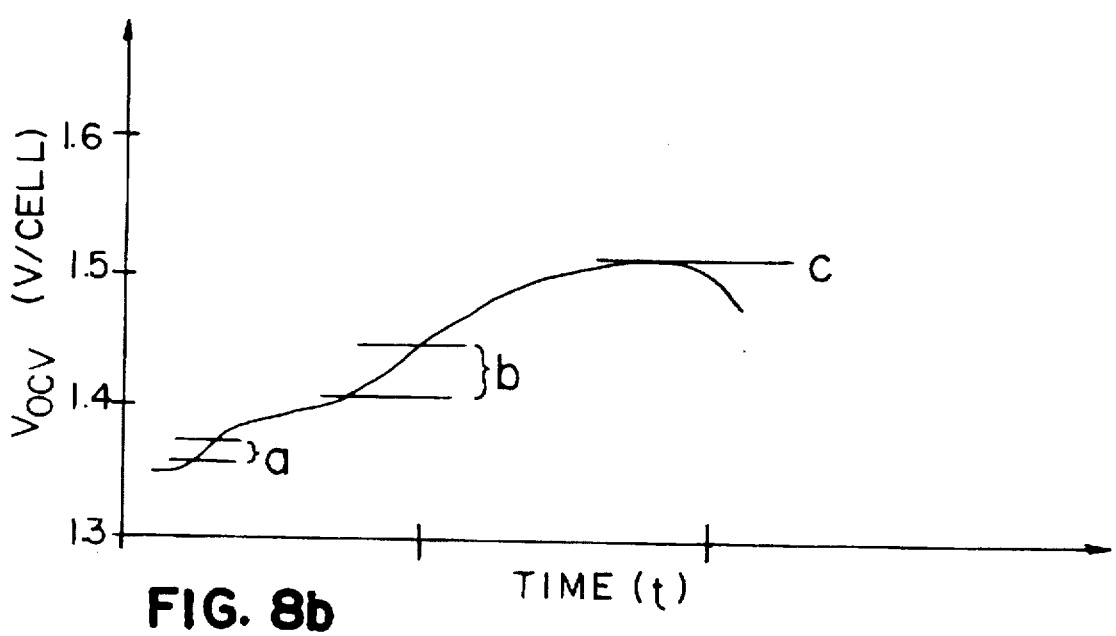
FIG. 8b is a graph of $V_{OCV}$ versus time for a battery charged according to the alternative approach of the present invention shown in FIG. 8b.

The second approach illustrated in FIG. 8a and FIG. 8b is similar to that outlined above (FIGS. 2a–2b) except that $V_{OCV}$ is sampled from the beginning of charging and the information obtained therefrom is utilized to adjust the current. When $\Delta T_1$ exceeds a predetermined temperature gradient $\Delta T°$ ($\Delta T_1 > \Delta T°$) the second order differential data is analyzed and compiled in order to locate a true transition point b (FIG. 8b) in the second order differential data $d^2V_{OCV}/dt^2 \leq 0$. When the true transition point b is recognized the charging current is lowered. It is important to note that prior to the recognition of $\Delta T_1 > \Delta T°$ all information regarding the second order differential, $d^2V_{OCV}/dt^2$, is ignored in order to avoid false termination or adjustment signals (i.e. point a in FIG. 8b). After the charging current is lowered all indicators of the onset of overcharge are utilized. Therefore, if a point corresponding to $d^2V_{OCV}/dt^2 \equiv 0$; $d^2V_{OCV}/dt^2<0$; $dV_{OCV}/dt \equiv 0$; $dV_{OCV}<0$; $dT/dt>dT°/dt$; or $\Delta T_2>\Delta T°$ then the charging current is switched to pulse trickle charging or terminated. It should be noted that if the slope of the temperature versus time curve exceeds a predetermined slope $dT/dt>dT°/dt$ prior to recognition of the predetermined temperature gradient $\Delta T_1$ charging is immediately switched to trickle or terminated. Additionally, since the open circuit voltage is monitored from the beginning of charging an inflection point or points (point c in FIG. 8b) on the first order differential $dV_{OCV}/dt \leq 0$, even if prior to $\Delta T_1 > \Delta T°$, is utilized as a signal to switch to trickle charge or as a signal to terminate the charging current.

Figure 5:
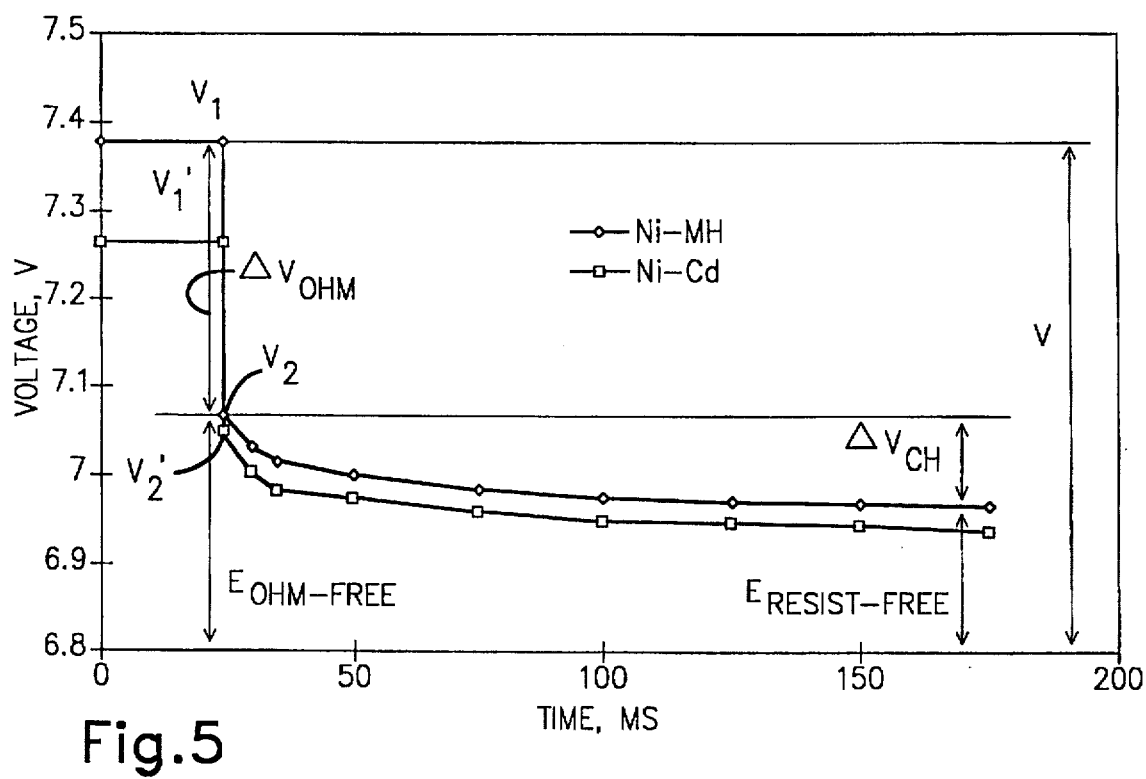
FIG. 5 is a charging curve for Ni—MeH and Ni—Cd batteries illustrating the interruption of charging current and the measurement of the open circuit voltage $V_{OCV}$ of a battery.

As seen in FIG. 2b, as a guard against overcharge, if neither the inflection point in the first order differential curve or the transition point in the second order differential curve is recognized, the negative slope on the $V_{OCV}(t)$ curve ($-\Delta V_{OCV}$) which occurs after inflection point or points c can be used to indicate onset of overcharge the signal to switch to charge termination or trickle charge. An absolute temperature maximum is utilized in the event that all other indicators are not identified. FIG. 5 shows the charging curve shortly before interrupting charging for nickel metal hydride and nickel cadmium batteries. FIG. 5 illustrates the importance of understanding the voltage components that are present when the current is interrupted to measure the open circuit voltage $V_{OCV}$ of the battery. Both chemical and electrical phenomena must be taken into consideration. Realizing the importance of these components permits more sensitive charge termination, calculation of accurate trickle charge, and optimum rate of charge to prevent battery degradation. The expression for battery charging voltage can be written as follows.

$$V = E_{OCV} + I(R_{ch} + R_\Omega) \quad (1)$$

where V is the battery voltage, $E_{OCV}$ is the unsteady open circuit voltage, $R_{ch}$ is the resistance due to chemical component and $R_\Omega$ is the resistance due to the ohmic component of the battery. The chemical resistance includes the electrochemical and diffusion increments of polarization of the electrode and the electrolyte. The unsteady open circuit voltage $E_{OCV}$ includes the polarization in solid phase of the nickel oxide electrode. Equation (1) can be rewritten in terms of overvoltage as:

$$V = E_{OCV} + \Delta V_{ch} + \Delta V_\Omega \quad (2)$$

where $\Delta V_{ch}$ is the overvoltage due to chemical components of the cell and $\Delta V_\Omega$ is the overvoltage due to the ohm component of the cell. This is illustrated on FIG. 5. As stated above, $V_\Omega$ is associated with the ohm component of cell resistance and disappears almost immediately after current interruption. Thus the time interval necessary to measure $V_\Omega$ is between 1–5 milliseconds. The limitation of one millisecond being a result of measurement devices or techniques which are unable to accurately sample in the time period lower than 1 millisecond. FIG. 5 illustrates that $\Delta V_\Omega$ is the difference between $V_2$ and $V_1$ for the nickel metal hydride battery and $V_2'$ and $V_1'$ for nickel cadmium battery.

The measurement time for $V_{ch}$ is generally taken after 5 milliseconds, but preferably within the range of 5–500 milliseconds after interruption. After 5 milliseconds, the open circuit voltage can be considered completely free of the ohmic component of the battery. Thus, the over voltage value which depends on the time interval after current interruption for measurement can provide specific information regarding charge termination, the rate of charge to be applied to the battery, and the trickle charge to be applied after the charging current has been terminated. Because the chemical over voltage $V_{ch}$ begins to disappear after 5 milliseconds after current interruption, it is important to measure the chemical interval soon after 5 milliseconds and no later than 500 milliseconds after current interruption. In nickel based batteries, the battery open circuit voltage value drops during the time period on the order of hours after charge termination. This phenomenon is associated with the unsteady processes on the nickel oxide electrode and approximately 500 ms is a reasonable time after which chemical polarization is negligible. The stationary value of open circuit value $E^O_{OCV}$ is equal to 1.31 volts for a nickel metal hydride battery and 1.29 volts for a nickel cadmium battery.

After the point indicating onset of overcharge is identified and the lower charge current is terminated, a trickle charge may be supplied to the battery to fully charge the battery and to prevent unwanted or self-discharge of the battery. This scheme is illustrated in FIG. 2 and, as indicated, may be provided in two alternative ways. The first alternative designated is to provide a relatively low, i.e. C/20–C/30 rate of trickle charge. This is illustrated as the relative low amplitude straight line in FIG. 2 and functions to maintain the battery of the fully charged condition and to recharge the battery for losses due to the salt discharge and/or to restore the energy discharge during intermittent use of the battery. However, the preferred mode of trickle charging is to pulse trickle charge (y). Pulse trickle charging provides the same amount of capacity to the battery, but in relatively short high intensity burst. As stated earlier, increased crystal size resulting from constant low amplitude trickle charging is adverse to the cycle life of the battery. Accordingly, a relatively high trickle charge rate is supplied to the battery, thereby decreasing the size of crystal formation on the electrodes. Although the pulsed rate is at a much higher rate, when the duration of the high current rate is factored in, the overall current charge is within the normally acceptable limits.

The amplitude of pulse trickle current I can be the same as the amplitude of the charging current (i.e. the lowered charging current). However, it is preferable to achieve an average trickle current within ($1/6$–$1/8$)I the rate of charge if time of charge at I current is more than one hour. If charge time is less than one hour, the amplitude of the pulse trickle current should be equivalent to the charging current, but the average trickle current value should be ($1/10$–$1/12$)I of the charging rate. The duration of trickle with any of two amplitudes should be one hour. After one hour, it is preferable to switch to stationary trickle with average value ($1/15$–$1/20$)I but having an amplitude equivalent to the charging current. In any case, the ohm-free voltage value should be used as a maximum value for the trickle charge. The reasons for this schedule of trickle charge are as follows: if charge time is more than 1 h then the charge current is less than 1 C and first step of trickle charge with maximum current $1/6$C gives 16% capacity maximum, but under relatively small average current conditions. This avoids overheating while continuing to charge the battery to a state of full or complete charge. Stationary trickle current with average is equal ($1/15$–$1/20$) of the charging current rate, but with amplitude value equal to the charging current rate supports high level of capacity during battery stand by. If charge duration is less than one hour then the rate of charge is more than 1 C and the first step of trickle charge with average current $1/10$–$1/12$ current rate provides enough charge capacity without overheating. It is very important to measure the ohm-free component ($\Delta V_\Omega$) of overvoltage during trickle, because this provides information as to when the chemical component of overvoltage begins. The chemical component of overvoltage being responsible for hydrogen production.

As an example of determining the proper trickle charge, the reference voltage used for prevention of hydrogen evolution on the cadmium electrode is 200 mV. This value provides a minimal overlap of variability range for overvoltage (100 mV) of the cell. Because the unsteady open circuit voltage value for nickel-cadmium cell has range 1350–1450 mV in the end of charge, (1350–1450)+200= 1550–1650 mV cell can be designated as reference termination voltage for prevention of hydrogen production on the cadmium electrode. The battery voltage should be measured within the interval 1<t<5 ms after current interruption in order to exclude the chemical component of overvoltage. The beginning of hydrogen production in the gas space is more uncertain for Ni—MeH cell because low overvoltage is needed for switching hydrogen production from solid phase where hydrogen is adsorbed to gas phase. However, the ohm component voltage value equal to about 1550–1650 mV was also found acceptable for Ni—MeH chemistry. As soon as ohm-free voltage reaches 1550–1650 mV /cell the value of the average trickle current should be dropped by at least a factor of two. This operation prevents hydrogen production in process of trickle charge. In nickel cadmium batteries, there is no mechanism for hydrogen consumption, and the method described above to control the rate of trickle charge is very important in achieving a long cell life cycle.

A method of establishing a rate of charge for a battery 11 is also disclosed herein. The rate of charge in ampere-hours results in a charging voltage being applied to the battery. The battery 11 has a thermonuetral potential $E^T$ and a stable open circuit voltage $E^O_{OCV}$. The method of establishing the rate of charge can compliment the methods discussed above or may be used independently of these methods. The method of establishing the rate of charge includes charging the battery with a charging current at an initial rate which is near the rated capacity in ampere-hours of the battery 11, interrupting the charging current to sample $V_{OCV}$ of the battery, and utilizing this $V_{OCV}$ to determine an amount of heat being produced by the battery 11. The rate of charge is then adjusted so as to result in more heat being consumed by the battery 11 at a rate equal or less than the heat being produced.

In order to avoid the possibility of overheating, $V_{OCV}$ is sampled at a time interval which is no later when the battery has achieved a charge an estimated one-half the rated capacity of the battery, preferably the charge is interrupted when the charge of the battery is from about 1–5% of the rated capacity of the battery, and most preferably when the charge of the battery is from about 1.5–4% of the rated capacity of the battery (i.e. around 2 minutes for 1 C current and 2–4 minutes for 0.5 C current).

The rate of charge in amperes-hour results in an overvoltage per cell. As discussed above, the overvoltage is the difference between the charging voltage and the stable open circuit voltage and is a function of the ohmic resistance and chemical resistance (see FIGS. 5 and 6). Utilizing the overvoltage information, the rate of charge is adjusted so that the overvoltage cell is close to the difference between the thermonuetral potential $E^T$ and the stable open circuit voltage $E^O_{OCV}$ of the battery 11.

The rationale for establishing the rate of charge is based on the fact that in terms of overvoltage the heat generated in the battery during charging is:

$$W = I(V-E^T) = I(E_{OCV} + \Delta V_{ch} + \Delta V_\Omega - E^T) \quad (3)$$

where V is the charging voltage, $E^T$ is the thermoneutral potential (1.45 V for NiCd; 1.35 V for NiMeH) or enthalpy. Since the stable open circuit value for NiCd (1.29 V) and NiMeH (1.31 V) are known, the difference between the thermonuetral potential and the stable open circuit voltage ($E^O_{OCV}-E^T$) is proportional to the cells entropy. For nickel metal hydride battery, the product of the entropy referred to one coulomb is equal to 0.04 V and for nickel cadmium batteries, the entropy value is equal to 0.16 V.

Accordingly, the rate of charge is adjusted to be inversely proportional to the overvoltage per cell. In the case of a nickel metal hydride battery the rate of charge in amperes-hour is adjusted to between 1 A and 2 A if the overvoltage per cell is less than 0.04 V per cell; adjusted to between 0.5 A and 1 A if the overvoltage per cell is between 0.04 V per cell and 0.08 V per cell; and adjusted to between 0.25 A and 0.5 A if the overvoltage per cell is greater than 0.08 V per cell. In the case of a nickel cadmium battery the rate of charge in amperes-hour is adjusted to between 4 A and 8 A if the overvoltage per cell is less than 0.04 V per cell; adjusted to between 0.4 A and 2 A if the overvoltage per cell is between 0.04 V per cell and 0.16 V per cell; and adjusted to 0.2 A and 0.5 A if the overvoltage per cell is greater than 0.16 V per cell.

Figure 6:
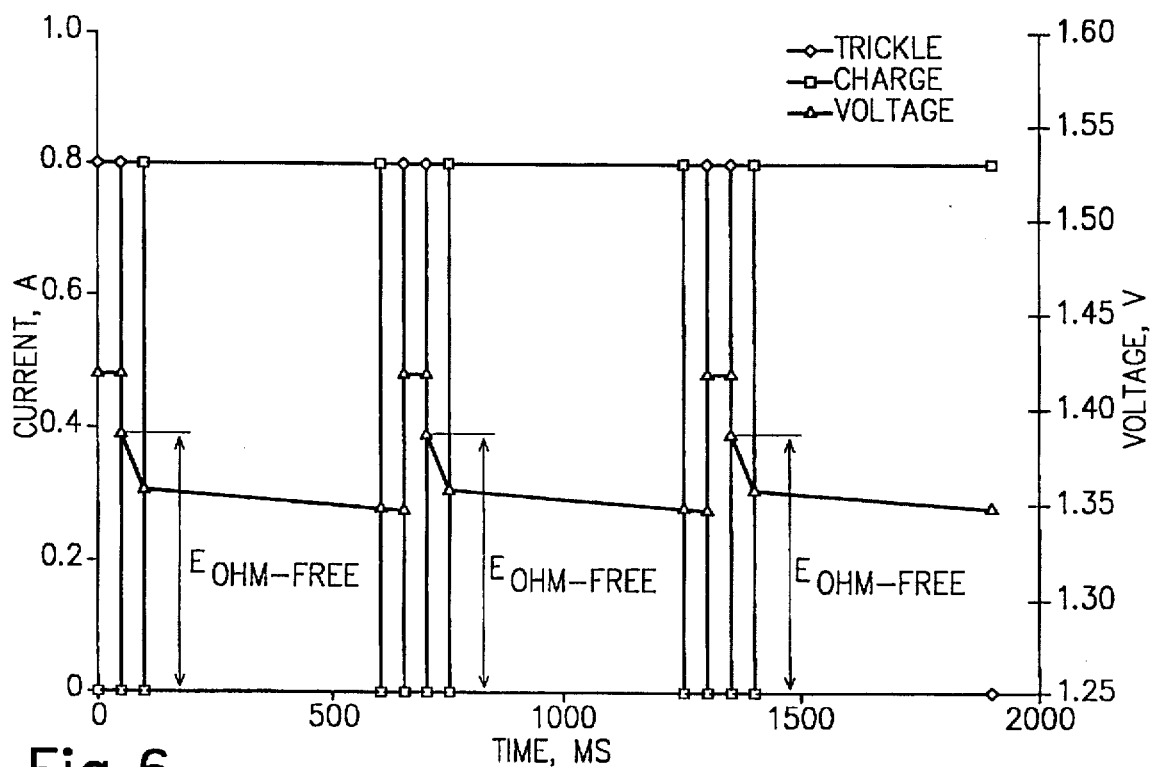
FIG. 6 illustrates an alternating schedule of charging to one battery and trickle charging to a second battery.

Additionally, as seen in FIG. 6, it is possible to schedule charging and interruption sequences so that more than one battery at a time may be charged or maintained at a trickle rate. FIG. 6 clearly illustrates this type of charging schedule. One battery is charged at maximum current and another one simultaneously at trickle charge. This approach allows a normal power supplier to be utilized based on the scheduling of charge and trickle charge. The pause during charge is used for switching on a trickle charge. This is possible because the time for trickle current is very short as compared to the rest period of the battery under charge. In this case, there is no increase in power required for the power supplier is the same.

In accordance with the present invention, FIG. 1 illustrates a schematic circuit diagram for the preferred embodiment of a battery charger 20 according to the present invention which is comprised of the necessary elements for achieving the methodology of charge termination, rate determination, and trickle charge determination described above. A rechargeable battery or cell 11 is connected to a power supply 13 through power manager 15, for example a 12 Volt 1 Amp AC adapter which provides charging current at a predetermined amplitude through current adjuster 18 to the battery 11. Voltage sensor 21 can include a scaler and senses and samples the voltage and open circuit voltage $V_{OCV}$ of the battery 11 and feed this information to microcontroller 22. The microcontroller 22 used in the present invention is a MC608HC705 B5 type and includes 6 KB memory ROM, 128 byte RAM, 4–8 bits parallel ports, 8 A/D inputs and 2 pulse width modulators (PWM). The shunt resistor or current sensor 12 can include a differential amplifier to accurately monitor the current applied to the battery or cell 11. A temperature detector or sensor 19 senses or measures the measuring the initial temperature $T_i$ of the battery 11, and also senses the charging temperature T of the battery 11. The temperature information is fed to a microcontroller 22 which compares the charging temperature T to the initial temperature $T_i$ to determine a temperature gradient $\Delta T$ for the battery (i.e. $T_{2-Ti}$). When a predetermined temperature gradient $\Delta T$ is recognized, the charging current may be lowered or adjusted by power manager 15 through current adjuster. After an equilibrium period which may be preset into microcontroller 22 or a timer 14, the current is interrupted by a relay 17 so that the open circuit voltage $V_{OCV}$ of the battery 11 can be sampled. The microprocessor or microcontroller 22 is used to run and monitor the operation of the circuit and to compile and analyze the values for the open circuit voltage $V_{OCV}$ with respect to charging time t elapsed to identify a point indicating onset of overcharge, the microprocessor 22 signaling termination of charging current when the point indicating onset of overcharge is identified. A data compiler 16 which may or may not be integrated into microcontroller 22 may function to compile the $V_{OCV}$ versus time t information to thereby minimize the microprocessor time dedicated to this task. Voltage sensor 21 is precise enough to measure the open circuit voltage within 1 millisecond of charge interruption to thereby obtain information regarding both the ohmic and chemical components of the cell or battery 11. This information is then used in the methods of: determining rate of charge, charge termination, and rate of trickle charge. It should be noted that the microcontroller 22 sensor 12, voltage sensor 21, temperature sensor 19, power manager 15, timer 14, current adjuster 18, and data compiler 16 may be collectively referred to as the battery charger because all or part may be integrated into said controlled by the microcontroller 22.

Figure 7:
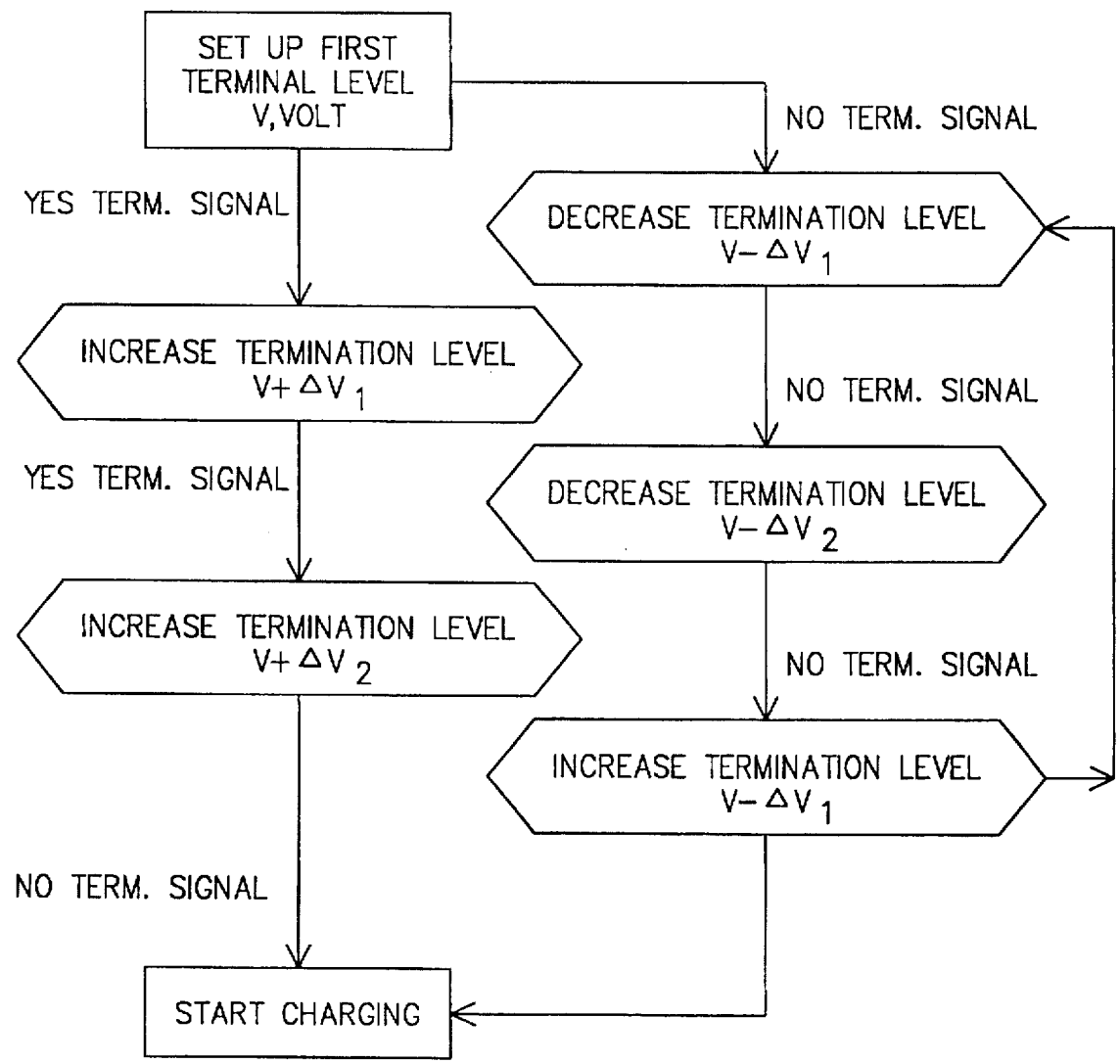
FIG. 7 is a flow chart illustrating an embodiment of the logic of the present invention.

The present invention also enables "noise" which is detected in measuring the open circuit voltage to be ignored or normalized. As stated herein, oxygen production is adverse to the useful life of the cell. However, oxygen is produced on the positive electrode and consumed on the negative electrode during the normal course of charging. However, there is a lag or delay between the cathode-consuming and anode-producing portions of the cell. The accumulated oxygen can be erroneously identified as a signal of overcharge. However, the present invention takes into account the time necessary to avoid this erroneous oxygen detection utilizing a derivation of the ideal gas law:

$$PV = \Delta C \, RT/4F \qquad (4)$$

where $\Delta C$ is oxygen capacity of the cell (time necessary to avoid noise); P is the maximum oxygen pressure usually in the range of (0.2–0.5 $10^5$ Pa); V is the free gas volume inside the battery; R is Bolzman constant (8.31$JK^{-1}$ $mol^1$); F is Faradays constant (96500 Cl). Utilizing this formula $\Delta C$ is approximately equal to 120 Cl/Ah. Accordingly, a 1 Ah capacity battery charged at 1 C provides a $\Delta C$ near 120 seconds. During this time period, the voltage detector 21 is calibrated to ignore this noise level. FIG. 7 illustrates how this information is utilized to adjust sensitivity of voltage detector 21. Initially, a termination signal or signal for oxygen production is chosen (i.e. 3 mV/cell). If no termination or oxygen production signal is detected, the termination voltage is reduced by a predetermined value (i.e. $\Delta V_1 = 1$ mV/cell). If no oxygen production signal is detected, the termination signal is reduced by a second predetermined value (i.e. $\Delta V_2 = 0.5$ mV/cell). When the value for termination signal is detected, the noise value is calibrated. This type of logic is illustrated in FIG. 7.

Although the preferred embodiments have been described in detail, it should be understood that the various changes, substitutions and alterations can be made without departing from the spirit and scope of the invention as defined by the appended claims. Specifically, combining one or more of the methods of charge termination, method of establishing trickle charge, method of establishing charge rate, and/or the method of scheduling more than one battery is clearly within the claims appended hereto.

What is claimed is:

1. A method of charging a rechargeable battery comprising:

measuring an initial temperature $T_i$ of the battery;

charging the battery with a charging current;

sensing a charging temperature T of the battery;

comparing the charging temperature T of the battery to the initial temperature $T_i$ of the battery to derive a temperature factor which indicates a need to adjust the charging current;

sampling an open circuit voltage $V_{OCV}$ of the battery;

compiling values for the open circuit voltage $V_{OCV}$ with respect to charging time t elapsed;

analyzing the compiled values for $V_{OCV}$ and t to identify one or more $V_{OCV}$ points which indicate a need to adjust the charging current;

continuing charging if the temperature factor or $V_{OCV}$ points are not identified; and adjusting the charging current if the temperature factor or $V_{OCV}$ points are identified.

2. The method of claim 1, wherein the temperature factor is a temperature gradient $\Delta T$ $(T - T_i)$ of the battery.

3. The method of claim 2, wherein the values compiled for $V_{OCV}$ and t are used to calculate open circuit voltage $V_{OCV}(t)$ data as a function of time, first order differential data $dV_{OCV}/dt$, and second order differential data $d^2V_{OCV}/dt^2$, and wherein the $V_{OCV}$ point which indicates a need to adjust the current is selected from the group consisting of:

a. an inflection point in the $dV_{OCV}/dt$ data;

b. a transition point in the $d^2V_{OCV}/dt^2$ data;

c. a negative slope in the $V_{OCV}(t)$ data, and d. a function of any two or all three of the above points.

4. The method of claim 3, wherein charging current is adjusted to a lower charging current if the temperature gradient $\Delta T$ is greater than a predetermined temperature gradient $\Delta T°$ ($\Delta T > \Delta T°$).

5. The method of claim 4, wherein the transition point in the $d^2V_{OCV}/dt^2$ data is ignored unless the temperature gradient $\Delta T$ is greater than a predetermined temperature gradient $\Delta T°$ ($\Delta T > \Delta T°$).

6. The method of claim 5, wherein the charging current is adjusted if the transition point in the $d^2V_{OCV}/dt^2$ data is identified.

7. The method of claim 6, wherein the charging current is adjusted to a trickle charge if the transition point in the $d^2V_{OCV}/dt^2$ data is identified.

8. The method of claim 5, wherein the charging current is adjusted if the inflection point in the $dV_{OCV}/dt$ data is identified.

9. The method of claim 8, wherein the charging current is adjusted to a trickle charge if the inflection point in the $dV_{OCV}/dt$ data is identified.

10. The method of claim 8, wherein the charging current is adjusted if the negative slope in the $V_{OCV}(t)$ data is identified.

11. The method of claim 10, wherein the charging current is adjusted to a trickle charge if the negative slope in the $V_{OCV}(t)$ data is identified.

12. The method of claim 10, wherein the charging current is adjusted if a second temperature factor is identified.

13. The method of claim 12, wherein the charging current is adjusted to a trickle charge if the second temperature factor is identified.

14. The method of claim 12, wherein the second temperature factor is selected from the group consisting of a slope $dT/dt$ and a temperature gradient $\Delta T$.

15. The method of claim 14, wherein charging current is adjusted if either the temperature gradient $\Delta T$ is greater than a predetermined temperature gradient $\Delta T°$ ($\Delta T > \Delta T°$) or the slope $DT/dt$ is greater than a predetermined slope $dT/dt°$.

16. The method of claim 3, wherein the open circuit voltage $V_{OCV}$ is sampled within 5–500 ms after interrupting charging.

17. The method of claim 4, wherein the step of sampling the open circuit voltage $V_{OCV}$ occurs after the temperature gradient $\Delta T$ is identified.

18. The method of claim 17, wherein the charging current is adjusted to a trickle charge if the transition point in the $d^2V_{OCV}/dt^2$ data is identified.

19. The method of claim 18, wherein the charging current is adjusted to a trickle charge if the inflection point in the $dV_{OCV}/dt$ data is identified.

20. The method of claim 19, wherein the charging current is adjusted to a trickle charge if the negative slope in the $V_{OCV}(t)$ data is identified.

21. The method of claim 20, wherein the charging current is adjusted to a trickle charge if a second temperature factor is identified.

22. The method of claim 12, wherein the second temperature factor is a slope $dT/dt$.

23. The method of claim 12, wherein the second temperature factor is a second temperature gradient $\Delta T_2$.

24. The method of claim 17, wherein a predetermined time period is allowed to elapse after lowering the charge current prior to sampling the open circuit voltage $V_{OCV}$ of the battery.

25. The method of claim 24, wherein the predetermined time period is sufficient to avoid false identification of the negative slope in the $V_{OCV}(t)$ data.

26. The method of claim 25, wherein the predetermined time period is from about 1 minutes to about 6 minutes.

27. The method of claim 13, wherein the rate of trickle charge substantially prevents crystal formation in the battery's electrodes.

28. The method of claim 27 wherein the step of supplying a trickle charge further includes:

interrupting the trickle charge periodically to sample a trickle open circuit voltage $V_{OCV}$ (trickle), and an ohm-free voltage $V_\Omega$;

comparing the ohm-free voltage $V_\Omega$ with a predetermined threshold trickle charge, said threshold trickle charge being dependent on the sum of an overvoltage value for a hydrogen producing electrode and the trickle open circuit voltage $V_{OCV}$ (trickle) of the battery; and reducing the trickle charge if said ohm-free voltage $V_\Omega$ exceeds said sum of the overvoltage value and a trickle open circuit voltage $V_{OCV}$ (trickle) of the battery.

29. The method of claim 28, wherein the ohm-free voltage $V_\Omega$ is sampled from about one millisecond to about 5 milliseconds after interrupting the trickle charge, and the trickle open circuit voltage $V_{OCV}$ (trickle) is sampled between about 5 and 100 milliseconds after interrupting the trickle charge.

30. The method of claim 13, wherein a second battery is also provided and further including the step of alternating charging and trickle charging between said first initial battery and said second battery.

31. The method of claim 1, wherein charge current is periodically adjusted to be inversely proportional to an overvoltage per cell, said overvoltage being the difference between the charging voltage and the open circuit voltage $V_{OCV}$ of the battery, said rate of charge being adjusted so that the overvoltage per cell is less than the difference between the thermonuetral potential $E^T$ and the stable open circuit voltage $E^O{}_{OCV}$ of the battery.

32. A battery charger for charging a rechargeable battery comprising:

a power supply to provide charging current to said battery or cell;

a temperature sensor for sensing an initial temperature $T_i$ and a charging temperature T of the battery;

a temperature comparator for comparing the charging temperature T to the initial temperature $T_i$ to derive a temperature factor which indicates the need to adjust the charging current;

a charge interrupter for periodically interrupting the charging current;

a voltage sensor for sampling an open circuit voltage $V_{OCV}$ of the battery;

a data compiler for compiling and analyzing the values of $V_{OCV}$ with respect to charging time t elapsed to identify a $V_{OCV}$ point indicating a need to adjust the current;

a charging current adjuster for adjusting the charging current when the temperature factor or $V_{OCV}$ points are identified.

33. The battery charger of claim 32, wherein the temperature factor is the temperature gradient $\Delta T$ $(T-T_i)$ of the battery.

34. The battery charger of claim 33, wherein the values compiled for $V_{OCV}$ and t are used to calculate time as a function of the open circuit voltage $V_{OCV}(t)$ data, first order differential data $dV_{OCV}/dt$, and second order differential data $d^2V_{OCV}/dt^2$, and wherein the $V_{OCV}$ point which indicates a need to adjust the current is selected from the group consisting of:

a. an inflection point in the $dV_{OCV}/dt$ data;
 b. a transition point in the $d^2V_{OCV}/dt^2$ data;
 c. a negative slope in the $V_{OCV}(t)$ data, and
 d. a function of any two or all three of the above points.

35. The battery charger of claim 34, wherein charging current is adjusted to a lower charging current if the temperature gradient $\Delta T$ is greater than a predetermined temperature gradient $\Delta T°$ ($\Delta T > \Delta T°$).

36. The battery charger of claim 35, wherein the transition point in the $d^2V_{OCV}/dt^2$ data is ignored unless the temperature gradient $\Delta T$ is greater than a predetermined temperature gradient $\Delta T°$ ($\Delta T > \Delta T°$).

37. The battery charger of claim 36, wherein the charging current is adjusted to a trickle charge if the transition point in the $d^2V_{OCV}/dt^2$ data is identified.

38. The battery charger of claim 37, wherein the charging current is adjusted to a trickle charge if the inflection point in the $dV_{OCV}/dt$ data is identified.

39. The battery charger of claim 38, wherein the charging current is adjusted to a trickle charge if the negative slope in the $V_{OCV}(t)$ data is identified.

40. The battery charger of claim 39, wherein the charging current is adjusted to a trickle charge if a second temperature factor is identified.

41. The battery charger of claim 40, wherein the second temperature factor is selected from the group consisting of a slope $dT/dt$ and a temperature gradient $\Delta T$.

42. The battery charger of claim 41, wherein charging current is adjusted if either the temperature gradient $\Delta T$ is greater than a predetermined temperature gradient $\Delta T°$ ($\Delta T > \Delta T°$) or the slope $dT/dt$ is greater than a predetermined slope $dT/dt°$.

43. The battery charger of claim 32, wherein the open circuit voltage $V_{OCV}$ is sampled within 5–500 ms after interrupting charging.

44. The battery charger of claim 35, wherein the step of sampling the open circuit voltage $V_{OCV}$ occurs after the temperature gradient $\Delta T$ is identified.

45. The battery charger of claim 44, wherein a predetermined amount of time is allowed to elapse before sampling $V_{OCV}$, said predetermined time period being sufficient to avoid false identification of the negative slope in the $V_{OCV}(t)$ data.

* * * * *